March 16, 1954     C. M. SIMPSON ET AL     2,672,609
DIRECTION FINDER
Filed Oct. 11, 1945
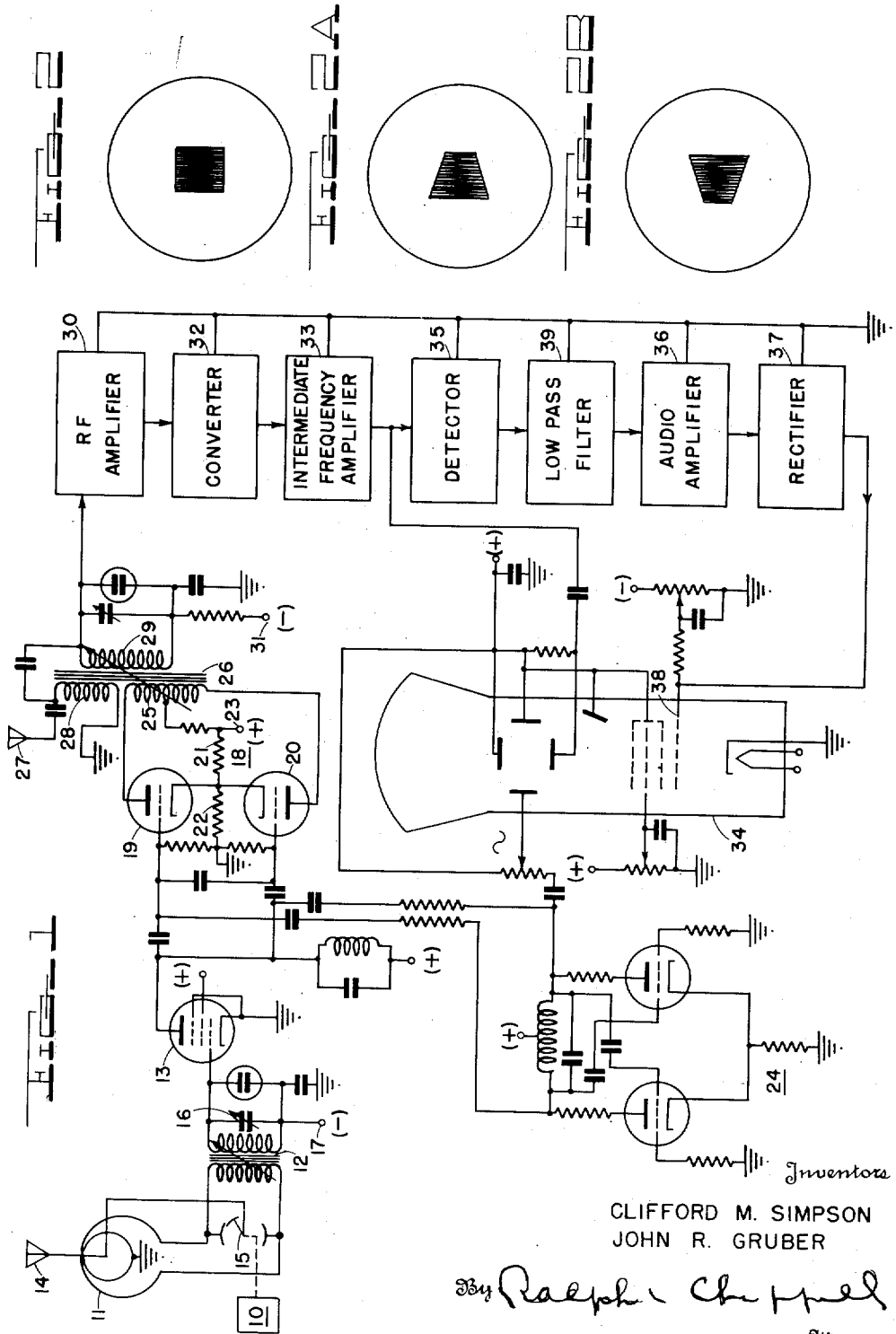
Inventors
CLIFFORD M. SIMPSON
JOHN R. GRUBER
By Ralph Chappell
Attorney Patented Mar. 16, 1954

2,672,609

UNITED STATES PATENT OFFICE 2,672,609

DIRECTION FINDER

Clifford M. Simpson and John R. Gruber,
Washington, D. C.

Application October 11, 1945, Serial No. 621,653

4 Claims. (Cl. 343—121)

(Granted under Title 35, U. S. Code (1952),
sec. 266)

This invention relates to radio direction finders employing a cathode ray tube indicating device. More particularly it relates to direction finders of the foregoing type capable of giving an accurate indication of direction despite the presence of reemitted energy in the signal applied thereto.

In many of the present forms of radio direction finding devices, a directive antenna system is employed possessing at least one null in its field intensity pattern in a given plane. Typical antenna systems are those having a figure eight field pattern such as the simple loop antenna or the so-called goniometer, the former being rotatably mounted, the latter fixedly mounted and provided with variable coupling to produce directive positioning of a null point of response. In any case, whenever it is desired to determine the direction of a distant signal source, the orientation of the aforementioned antenna response pattern is adjusted so that a minimum response to the signal source results. Thus it is established that the signal source is in the direction of a null point in the response pattern of the antenna system. Great angular resolution is possible because of the rapid change in antenna response on either side a null point.

In antenna systems, such as those previously mentioned, which provide a pattern possessing more than a single null point in the desired plane, some means must be provided for determining which null point is in the direction of the signal source. One method by which this is accomplished is combining a second voltage derived from the received signal in a manner providing omnidirectional reception characteristics with the voltage produced by the directive antenna. In such a system, of which many examples are known in the prior art, the resulting differences in the phases and in the amplitudes of the two signals provides the basis for the distinction and place the stringent requirement of a non-varying phase or amplitude change existing through the circuits coupling and combining the two signals. Where operation over an extended frequency range is desired, this requirement is not easily met because of the difficulty of tracking. The situation is further complicated by the effects of temperature, aging and vibration which may combine to give large errors.

In bearing indicating devices of the foregoing general type an additional condition which produces erroneous indications frequently arises when energy form the distant source, after striking a nearby object, is reemitted and travels to the antenna system. Under such conditions a distinct null point in the response pattern of the directive antenna system is not realized but rather a minimum. Furthermore this minimum point is located in a direction in which the sum of the direct and reemitted signals is a minimum and not, necessarily, in the direction in which the direct signal is a minimum.

An object of the present invention is to provide a radio direction finding system in which a signal component present in the output from a directive antenna system due to the reemission of energy from nearby surfaces is balanced out.

Another object of the present invention is to provide a direction finding system which is not subject to the errors produced by incomplete tracking of the tuned circuits or of mistuning of the circuits themselves due to temperature, aging, vibration, etc.

Another object of this invention is to provide an improved form of radio direction indicating device in which a cathode ray tube is employed to indicate the presence of a desired signal and to permit the attainment of a sharply defined direction indication.

Another object of the present invention is to provide a differential coupling system for periodically inserting a signal of the proper phase and amplitude into the signal from a directive type antenna system to periodically balance out a signal component existing in the output from the directive antenna system due to the reception of a signal reemitted from a nearby surface, together with a system for operating an indicator device only during the periods in which a balanced condition exists.

Other objects and features of the present invention will become apparent upon a careful consideration of the accompanying drawings and detailed description.

Fig. 1 is a schematic diagram, partly in block, showing one embodiment of the features of the present invention.

Figs. 2, 2A, and 2B show typical indications observed on the indicator face for various conditions existing during a direction finding operation.

In accordance with the fundamental concepts of the invention, the output signals from a directive antenna system and an omnidirective antenna system are combined in such a manner that a periodic cancellation of reemitted signal components in the output of the directive antenna systems results. By this means then, a sharply defined null point in the output of the directive antenna system is obtained. The invention further provides an indicator system of the cathode ray tube type which produces an indication only in the vicinity of a null response point and gives an indication as to motion of the null to either side of the signal direction while at the same time providing a method of establishing operation on a particular null point in the response pattern of a directive antenna system possessing a plurality of null points.

In a typical method of presenting the information thus obtained, the radio frequency voltage produced as outlined above is applied to a balanced modulation system to which is also applied a low frequency audio modulating signal. The balanced modulator causes suppression of the radio frequency carrier but produces side band frequency components displaced on either side of the carrier frequency by an amount equal to the frequency of the low-frequency modulating signal. These sidebands disappear, however, each time the composite radio frequency signals pass through the zero values.

The radio frequency carrier from an antenna system possessing omnidirectional characteristics in the chosen plane is then reinserted into the side band signals. The resulting combination of radio frequency carrier and side bands is then applied to a cathode ray tube indicator, either directly or after frequency conversion, to produce vertical deflection of the electron beam therein, and also to a detector to obtain the modulation contained thereon. After suitable amplification and rectification, this modulation signal is applied as intensity modulation to the cathode ray tube to cause cut-off of the electron beam on all except the small amplitude signals.

The low frequency modulating signal applied to the balanced modulator is also applied to the cathode ray tube indicator to produce horizontal sweep.

The high frequency carrier envelope as applied to the cathode ray tube does not contain modulation introduced by the balanced modulator when a sharply defined null in the directive antenna pattern is realized, however, high frequency carrier modulation is present with operation on either side of the null position, the percentage modulation varying with the angular deviation from this position. With operation in one lobe of the field pattern of a figure eight directive antenna system, this modulation is essentially in phase with the low frequency modulating signal, whereas with operation in the other lobe of the field pattern the modulation bears essentially a 180-degree phase relationship to the modulating signal. Thus the shape of the pattern observed on the cathode ray tube indicator changes as the antenna pattern changes from one lobe, through a null and into the other lobe, however, a pattern is not visible when the angular deviation from the null point becomes large.

In particular, the invention as typified by the example shown in Fig. 1 provides a radio direction finding system operable in the horizontal plane employing a directive type antenna system 11 possessing a figure eight intensity pattern in the horizontal plane. This antenna pattern, as the designation implies, comprises two main lobes of substantially identical intensity and shape with two positions of near zero intensity located angularly between. The two zero positions bear an approximate 180-degree angular relationship one to the other.

As previously mentioned, under conditions of reception of direct signals from a distant signal source and weaker signals from the distant signal source which are reflected from a nearby object, the null points for the signal do not coincide with those from the reflected signal and consequently a true null point cannot be attained but rather a minimum point. To eliminate the reflected signal so that a true null in the response to the direct signal is possible, an antenna 14, possessing omnidirectional characteristics in the horizontal plane is located in proximity to the directive antenna 11. The location of this antenna is preferably chosen so that the phase of the voltage induced in it is midway between the voltage induced in each side of the directional antenna 11 regardless of the angular orientation of antenna 11. This requirement is generally satisfied if the two antennas are located a small fraction of a wavelength apart. A suitable variable coupling device 15, shown in Fig. 1 as of the condenser type is employed to apply the output of the omnidirectional antenna 14 to the output of the directional antenna 11 so that the phase and amplitude of the signal from antenna 14 may be selectively varied to achieve optimum cancellation of the signal received by antenna 11 from the reflecting surface. Capacitor 15 is preferably provided with three sections one of which is connected to antenna 14 and rotatively positioned between two stationary sections connected to antenna 11 by means of a drive assembly 10. When the rotatable section is mechanically driven as shown providing in the first case two null positions are produced during each complete revolution. Other forms of variable coupling devices, of a resistance or inductance type, for example, may be similarly employed to perform the function of the capacitor coupling device 15.

The secondary winding of transformer 12 is tuned by means of capacitance 16 to resonance at the frequency of the incoming signal. The voltage produced across this circuit is applied to the control grid of a conventional radio frequency amplifier 13, bias for which may be applied to point 17 from a suitable source of automatic volume control voltage.

The radio frequency signal from amplifier 13 is applied in push-push arrangement to a balanced modulator 18. The two tubes 19, 20 of modulator 18 are preferably biased at cutoff by a positive voltage maintained at their cathodes due to voltage divider action across resistances 21, 22 from a positive source 23. Also applied to the grids of the modulator 18 in push-pull is a low frequency modulating signal generated by a suitable local oscillator which is typified by the two-tube multivibrator 24 shown in the drawing. The plates of the modulator tubes 19, 20 are connected to a primary winding 25 of the radio frequency transformer 26.

Tubes 19, 20 are driven to alternate conduction by the push-pull low-frequency signal from oscillator 24, however, this low-frequency signal does not appear across the primary winding 25 because of the low impedance of the winding to the low-frequency modulating signal. Also, in periods during which a radio frequency signal is applied to tube 13, the side band frequencies appear across the primary winding 25 but the radio frequency carrier signal is suppressed being applied in equal amplitude to both sides of winding 25.

A radio frequency signal from the same source as that being received by the directive antenna 11 is received by a second antenna 27 possessing omnidirectional characteristics in the horizontal plane and applied to a second primary winding 28 on transformer 26. This carrier is therefore added to the sidebands produced in the modulator 18 and applied by means of the tuned secondary winding 29 of transformer 26 to a radio frequency amplifier 30, bias for which is supplied to point 31 from a suitable source of automatic volume control voltage. The composite signal thus produced bears the characteristics of an amplitude modulated carrier, however, variations in the amplitude of the modulated envelope are in phase with the variations of one or the other of the push-pull modulating signals from multivibrator 23 depending upon which lobe of the directive antenna field pattern is being employed. This arises from the fact that the instantaneous value of a current (i) produced at any instant (t) during a modulation process is given by the following equation:

$$i = I_1 \sin \omega_H t + \frac{m_a I_2}{2} \cos (\omega_H - \omega_L) t - \frac{m_a I_2}{2} \cos (\omega_H + \omega_L) t$$

Where:

$I_1$ = amplitude of the high frequency carrier reinserted by antenna 27.
$I_2$ = amplitude of the high frequency carrier from antennas 11, 14.
$\omega_H$ = the carrier frequency.
$\omega_L$ = the modulating frequency from oscillator 24.
$m_a$ = percentage of modulation of carrier $I_2$ by the signal $\omega_L$.

Thus, it can be seen that the reception of $I_1$ in one lobe of the directive antenna 11 will produce a signal in which the modulation is displaced 180 degrees from the modulation when receiving in the other lobe so that the algebraic sign of $I_1$ will change to a negative value.

In the two angular positions of antenna 11 in which a complete null or cancellation of the radio-frequency signal to transformer 12 is produced, side band energy is not applied to transformer 26 and the unmodulated carrier from antenna 27 is applied to amplifier 30.

In this application, transformer 26 functions primarily as a mixing device to combine the sideband signals with the carrier signal. It is therefore possible to employ other suitable mixing means to perform this function.

In the preferable arrangement the radio frequency signals from amplifier 30 are subjected to frequency conversion in a converter 32 in a manner similar to that occurring in a conventional superheterodyne receiver.

The intermediate or "standard" frequency envelope thereby produced is then amplified in a tuned amplifier 33 and applied to a cathode ray tube indicator to produce a vertical deflection of the electron beam. This signal is also applied to a detection system 35 which functions to reproduce the modulation contained on the carrier. In this connection it should be noted that radio frequency signals direct from amplifier 30 may be applied to the indicator 34 without resorting to the frequency conversion process.

The modulation signal reproduced by detector 35 is amplified in a system 36 provided for that purpose. The output of amplifier 36 is then rectified in a suitable rectifier 37, preferably of the full wave type and applied as a negative bias to the intensity control element 38 of the cathode ray tube 34. Thus, under conditions in which the intermediate frequency carrier is heavily modulated as a result of the production of large amplitude side band signals by modulator 18 under conditions of signal reception from directions far removed from the null points in the field pattern of antenna 11, the rectified low-frequency signal will be applied as an additional negative bias to element 38 of tube 34 to cut off the electron beam. When the percentage modulation of the intermediate frequency signal is small, as in the vicinity of a null, or absent completely as at a null, the signal developed negative bias is sufficient to prevent electron flow to the face of the cathode ray tube.

Since it is desirable that the direction finder be operative upon signal sources emitting amplitude modulated signals, suitable steps must be taken to insure that the modulation contained upon the amplitude modulated signal does not cause a variation in the bias on element 38. Therefore, the frequency of the modulating signal produced by oscillator 24 is kept low (approximately 90 cycles per second in a typical case) and a low-pass filter 39 with a cutoff frequency of approximately 200 cycles per second is inserted between the detector 35 and the audio amplifier 36. Thus, only the low-frequency modulating signal produced by oscillator 24 and the second harmonic thereof are capable of intensity modulating the cathode ray tube. Normally, the amount of energy below 200 cycles per second emitted in the modulation envelope of amplitude modulated carriers is very small, particularly where voice modulation is employed so that intensity modulation of the cathode ray tube by modulation contained on the carrier reinserted from antenna 27 is not of importance.

It should be noted that the time constant of the filter circuit in the rectifier 37 must be sufficiently short to permit intensification of tube 34 during the relatively brief instants during which the balancing of the input reflected signal component occurs. Since the tube 34 is intensified for relatively short intervals at the rate of 260 per minute, twice for each revolution of capacitor 15, it is preferable that the tube be provided with a long persistence screen.

Horizontal deflecting voltage for tube 34 is obtained from the oscillator 24 and is substantially the same as the voltage applied to one side (tube 20) of the balanced modulator 18. Thus, upon application of the sinusoidal deflecting voltage, the electron beam is caused to move from the center, reaching a maximum sidewise deflection at one crest of the modulating voltage, pass through the center of the tube reaching a maximum deflection to the opposite side during the crest of opposite polarity of the modulating signal and then return to the center of the face for the start of the second modulation cycle.

The presentation of direction data upon the face of the indicator tube 34 is better illustrated with the aid of Figs. 2, 2A, and 2B. Fig. 2 shows an indication obtained when the loop antenna 11 is oriented so that a null is in the direction of the signal source, and the signal injected by capacitor 15 is suitable for cancelling any signal component present due to reflections from nearby surfaces. Fig. 2A shows the indication obtained when the signal source is located slightly to the left of the reference null point, with a condition of balanced reflected signal existing. Fig. 2B shows the indication obtained with the signal source to the right of the true null point and with a balanced reflected signal condition.

With particular reference to Fig. 2, the unmodulated signal envelope applied to the vertical deflection means of the cathode ray tube under a condition of zero signal applied to the primary of transformer 16 is of constant amplitude (supplied by antenna 27) regardless of the value of the modulating horizontal sweep voltage, thus a rectangular pattern is observed.

In Fig. 2A a trapezoidal pattern is shown which is wide at the left side and narrow at the right as would be produced where the envelope of the standard frequency carrier is in phase with the modulating voltage applied as horizontal sweep.

In Fig. 2B, a pattern the opposite of that of Fig. 2A, narrow at the left and wide at the right is shown. In this illustration the bearing of the signal source with respect to the null point is the opposite of that which produced Fig. 2A. The standard frequency carrier bears a 180 degree phase relationship to the modulating voltage applied as sweep, as would be the case where operation is on the opposite lobe of antenna 11 as was the case with Fig. 2A.

Thus, it is possible to orient the antenna until the rectangular pattern is observed at which case the distant signal source is in the direction of a known null in the pattern of antenna 11.

It is apparent that the rectangular pattern is obtainable for either null in the field pattern of antenna 11, however, by slight angular motion of the antenna 11, it is possible to establish which null is being employed. When operating in the vicinity of one null point, rotation of the antenna in a clockwise direction will cause the rectangular pattern to become trapezoidal with the long end on one side of the scope face. When operating on the other null point, similar clockwise rotation of the antenna will produce a trapezoidal pattern with its wide side located on the opposite side of the scope face. Thus the indications of Figs. 2A, 2B would be reversed for deviations to the right and left from the second null point.

It should be noted that, although three separate antennas 11, 14, 27 are here shown for convenience, they could be replaced by a single properly designed antenna system.

From the foregoing discussion it is apparent that considerable modification of the features of this invention are possible, and while the device herein described and the form of apparatus for the operation thereof, constitutes a preferred embodiment of the invention it is to be understood that the invention is not limited to this precise device and form of apparatus, and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. A radio direction finder; comprising, an antenna system possessing at least one null response direction in a given plane for deriving a first type signal, an omnidirectional antenna system providing omnidirectional response in the given plane for deriving second type signals, variable coupling means combining said first and second type signals in varying degrees, a low frequency signal source, modulating means deriving side band signals from the combined antenna signals and signals from the low frequency signal source, mixing means combining the side band signals with the second type signals, a cathode ray tube indicator, means deflecting the electron beam of said indicator in a first direction in accordance with the amplitude of the output from said mixing means, means deflecting the electron beam of said indicator in a second direction perpendicular to the first direction in accordance with the aforementioned low frequency signal, and intensity modulation means controlling the flow of the electron beam in said indicating device in accordance with the modulation contained in the output of said mixing means.

2. A radio direction finder comprising, a loop type antenna, an omni-directional antenna, variable coupling means for applying a continuously varying amplitude signal from the omnidirectional antenna into the loop antenna output, an oscillator for generating a low frequency, substantially sinusoidal signal, modulating means for producing sideband signals from the combination of the low frequency sinusoidal signal and a radio frequency carrier signal, a second omnidirectional antenna, mixing means combining the side band signals with the carrier signal from said second omnidirectional antenna, a cathode ray tube indicator, means deflecting the electron beam of said indicator in a first direction in accordance with the amplitude of the output from said mixing means, means deflecting the electron beam of said indicator in a second direction perpendicular to the first direction in accordance with the aforementioned low frequency sinusoidal signal, and intensity modulation means controlling the flow of the electron beam in said indicating device in accordance with the modulation contained in the output of said mixing means.

3. In a radio direction finder the combination of, a first antenna system having a figure eight response pattern in a given plane, a second antenna system located in proximity to the first antenna and in a definite physical relationship thereto, said second antenna possessing substantially omnidirectional characteristics in said plane, a receiver input circuit for receiving energy from said antennas, a coupling device, said coupling device movably driven and functioning to vary the signal applied to the input circuit from said second antenna, an oscillation generator, means modulating the received radio frequency signal with the output of the oscillation generator, a third antenna system located in proximity to the first two antennas and possessing substantially omnidirectional characteristics in the same plane, means combining the modulated radio frequency signal with the radio frequency signal from said third antenna, frequency conversion means for changing the signal output from the last named means to a selected reference frequency, demodulation means for obtaining the modulation contained upon the reference frequency signal, filter means connected in the output of said last named means selecting the modulation signals having the frequency generated by the oscillation generator and the low order harmonics thereof, a cathode ray tube indicating device, means for deflecting the electron beam in said device in one plane in response to the signal generated by the oscillation generator, and in a second, perpendicular, plane in response to the reference frequency signal, means for intensity modulating the electron beam of said cathode ray tube to provide an indication only at such instants in time at which there is small amplitude modulation frequency output from the aforementioned filter means.

4. A radio direction finder; comprising, an antenna system possessing at least one null response direction in a given plane for deriving a first type signal, an omnidirectional antenna system providing omnidirectional response in the given plane for deriving second type signals, variable coupling means combining said first and second type signals in varying degree, a low frequency signal source, modulating means deriving side band signals from the combined antenna signals and signals from the low frequency signal source, mixing means combining the side band signals with the second type signals to obtain mixed signals, and indicating means comparing the modulation on mixed signals with signals from the low frequency signal source.

CLIFFORD M. SIMPSON.
JOHN R. GRUBER.

References Cited in the file of this patent

UNITED STATES PATENTS

| Number | Name | Date |
|---|---|---|
| 2,146,745 | Jones | Feb. 14, 1939 |
| 2,252,063 | Cockerell | Aug. 12, 1941 |
| 2,392,420 | Steinhoff | Jan. 8, 1946 |
| 2,401,565 | Holmes | June 4, 1946 |